United States Patent
Scipioni et al.

(10) Patent No.: US 9,135,469 B2
(45) Date of Patent: Sep. 15, 2015

(54) INFORMATION PROTECTION SYSTEM

(75) Inventors: German Scipioni, San Jose, CA (US);
Avery Kadison, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 1392 days.

(21) Appl. No.: 11/365,644

(22) Filed: Feb. 28, 2006

(65) Prior Publication Data

US 2007/0244761 A1  Oct. 18, 2007

(51) Int. Cl.
*G06F 7/00* (2006.01)
*G06F 17/30* (2006.01)
*G06F 21/64* (2013.01)
*G06Q 20/20* (2012.01)

(52) U.S. Cl.
CPC .............. *G06F 21/64* (2013.01); *G06Q 20/206* (2013.01)

(58) Field of Classification Search
None
See application file for complete search history.

(56) References Cited

U.S. PATENT DOCUMENTS

| | | | |
|---|---|---|---|
| 5,706,507 A | 1/1998 | Schloss | |
| 5,835,712 A | 11/1998 | DuFresne | |
| 6,092,194 A | 7/2000 | Touboul | |
| 6,286,001 B1 | 9/2001 | Walker et al. | |
| 6,510,458 B1 | 1/2003 | Berstis et al. | |
| 6,604,131 B1 | 8/2003 | Warris et al. | |
| 6,874,084 B1 | 3/2005 | Dobner et al. | |
| 7,068,190 B2 | 6/2006 | Satomi et al. | |
| 2001/0034718 A1* | 10/2001 | Shaked et al. | 705/64 |
| 2002/0016910 A1 | 2/2002 | Wright et al. | |
| 2002/0062342 A1* | 5/2002 | Sidles | 709/203 |
| 2003/0097593 A1 | 5/2003 | Sawa et al. | |
| 2003/0163714 A1 | 8/2003 | Nortung | |
| 2003/0177067 A1* | 9/2003 | Cowell et al. | 705/14 |
| 2004/0078422 A1 | 4/2004 | Toomey | |
| 2004/0123157 A1 | 6/2004 | Alagna et al. | |
| 2005/0182667 A1* | 8/2005 | Metzger et al. | 705/4 |
| 2006/0021031 A1 | 1/2006 | Leahy et al. | |
| 2006/0089978 A1 | 4/2006 | Lee et al. | |
| 2006/0107217 A1* | 5/2006 | Lu et al. | 715/733 |
| 2006/0253582 A1* | 11/2006 | Dixon et al. | 709/225 |
| 2007/0107053 A1* | 5/2007 | Shraim et al. | 726/22 |
| 2007/0271339 A1* | 11/2007 | Katz | 709/204 |

OTHER PUBLICATIONS

U.S. Appl. No. 10/883,454, Response filed Dec. 20, 2007 to Non-Final Office Action mailed Sep. 20, 2007, 15 pgs.
U.S. Appl. No. 10/883,454, Final Office Action mailed Apr. 21, 2008, 12pgs.
U.S. Appl. No. 10/883,454, Non-Final Office Action mailed on Nov. 17, 2008, 8 pgs.

(Continued)

*Primary Examiner* — Hexing Liu
(74) *Attorney, Agent, or Firm* — Maschoff Brennan

(57) ABSTRACT

A method and a system to protect information are provided. For example, a system comprises a parser to parse user interface information to be included within a user interface to be displayed to a user by an information display application. The parser also identifies at least one field, within the user interface, to receive user information from a user. A detection module is provided to determine whether the user interface information is associated with fraudulent activity. A form fill module, in response to determining that the user interface is associated with fraudulent activity, provides a warning indicia in or over the at least one field, when the user interface is presented to a user by the display application. The form fill module may also disable the functionality of a user display application to automatically form fill the identified fields.

26 Claims, 9 Drawing Sheets

(56) References Cited

OTHER PUBLICATIONS

U.S. Appl. No. 10/883,454, Notice of Allowance mailed Jun. 11, 2009, 4 pgs.
"Do Security Toolbars Actually Prevent Phishing Attacks?", 1-10.
"eBay Introduces eBay Toolbar with Account Guard", http://www.paymentsnews.com/2004/02/ebay_introduces.html, (Observed on Feb. 28, 2006), 1 Page.
"eBay Toolbar Account Guard", http://pages.ebay.com/help/confidence/account-guard.html, 1-3.
"RoboForm Screen Shots: Manage Passwords, Organize Passwords, Password Finder", http://www.roboform.com/screen.html, (Observed on Feb. 28, 2006), 5 Pages.
"RoboForm User Manual (Printed Version)", http://www.roboform.com/manual-pr.html, (Observed Feb. 28, 2006), 42 Pages.
"Tours eBay Toolbar with Account Guard", http://pages.ebay.com/toolbars/accountguard_1.html, 1 Page.
"Tutorial Spoof (fake) Emails", http://pages.ebay.com/education/spooftutorial/spoof_1.html, (Observed Feb. 28, 2006), 2 Pages.
"Tutorial Spoof (fake) Emails", http://pages.ebay.com/education/spooftutorial/spoof_3.html, (Observed Feb. 28, 2006), 2 Pages.
Dhamija, Rachna, et al., "Why Phishing Works", 10 Pages.
Wu, Min, et al., "Do Security Toolbars Actually Prevent Phishing Attacks?", 1-2.
Wu, Min, "Thesis Proposal: Fighting Phishing at the User Interface", 31 Pages.

* cited by examiner

INFORMATION PROTECTION SYSTEM

TECHNICAL FIELD

The present application relates generally to the technical field of protecting information associated with a user interface. In one specific example, user information to be received from a user or from form fill functionality associated with a user interface in a network environment is protected against a spoofing or phishing attack or vulnerability.

BACKGROUND

In recent years, spoofing attacks to illegally obtain user information, in particular banking or payment details of a user, have become a more prevalent.

A spoofing attack (or event) is a situation in which a person or program successfully masquerades as another person or entity by falsifying data, thereby to obtain personal and confidential information of a user. Web page spoofing, or phishing, is a security attack where a legitimate web page, for example a bank or on-line vendor web site, is reproduced with similar characteristics of the original authentic web page, on another server under the control of an attacker. The attacker aims to mislead a user into believing that the user is connected to a trusted web site. Should the user enter any information on the spoofed web site, such as a username, password or banking information, the attacker would obtain this information and succeed in a security breach.

Phishing attacks may be performed with the aid of URL spoofing, where web browser bugs are exploited in order to display incorrect URLs in the browser's location bar. Alternatively, DNS cache poisoning may be used in order to direct the user away from the legitimate site and to the fake site.

The risks associated with spoofing and phishing attacks have been increased by the use of form fill applications, which provides user information for multiple predefined fields on a user interface or web page that has to be filled in.

To address the risks posed by spoofing and phishing attacks some applications make use of icons on toolbars to indicate that a web page is fraudulent. However, as these icons or toolbars are small and insignificant, users rarely pay attention to them and may even ignore them when providing a form fill instruction.

BRIEF DESCRIPTION OF THE DRAWINGS

The present application is illustrated by way of example and not limitation in the figures of the accompanying drawings, in which like references indicate similar elements and in which.

DETAILED DESCRIPTION

A method and system to protect information in a network and in particular, an Internet environment, are described. In the following description, for purposes of explanation, numerous specific details are set forth in order to provide a thorough understanding of the present application. It will be evident, however, to one skilled in the art that the present application may be practiced without these specific details. It will further be appreciated that this application may be relevant to various applications, for example banking web sites, on-line vendor web sites, e.g. e-Bay® of eBay Inc. of San Jose, Calif., or Amazon® of Amazon Technologies, Inc. of Reno, Nev., commercial web sites, or specific payment web sites, e.g. Paypal® of Paypal, Inc. of San Jose, Calif.

According to one example embodiment, there is provided an information protection system. The system comprises a parser to parse user interface information to be included within a user interface to be displayed to a user by an information display application. The parser identifies at least one field, within the user interface, to receive user information from a user. A detection module is provided to determine whether the user interface information is associated with fraudulent activity. In response to determining that the user interface is associated with fraudulent activity, a form fill module provides a warning indicia in or over the at least one field, when the user interface is presented to a user by the display application.

Other features of the application will be apparent from the accompanying drawings and from the detailed description that follows.

Platform Architecture

Figure 1:
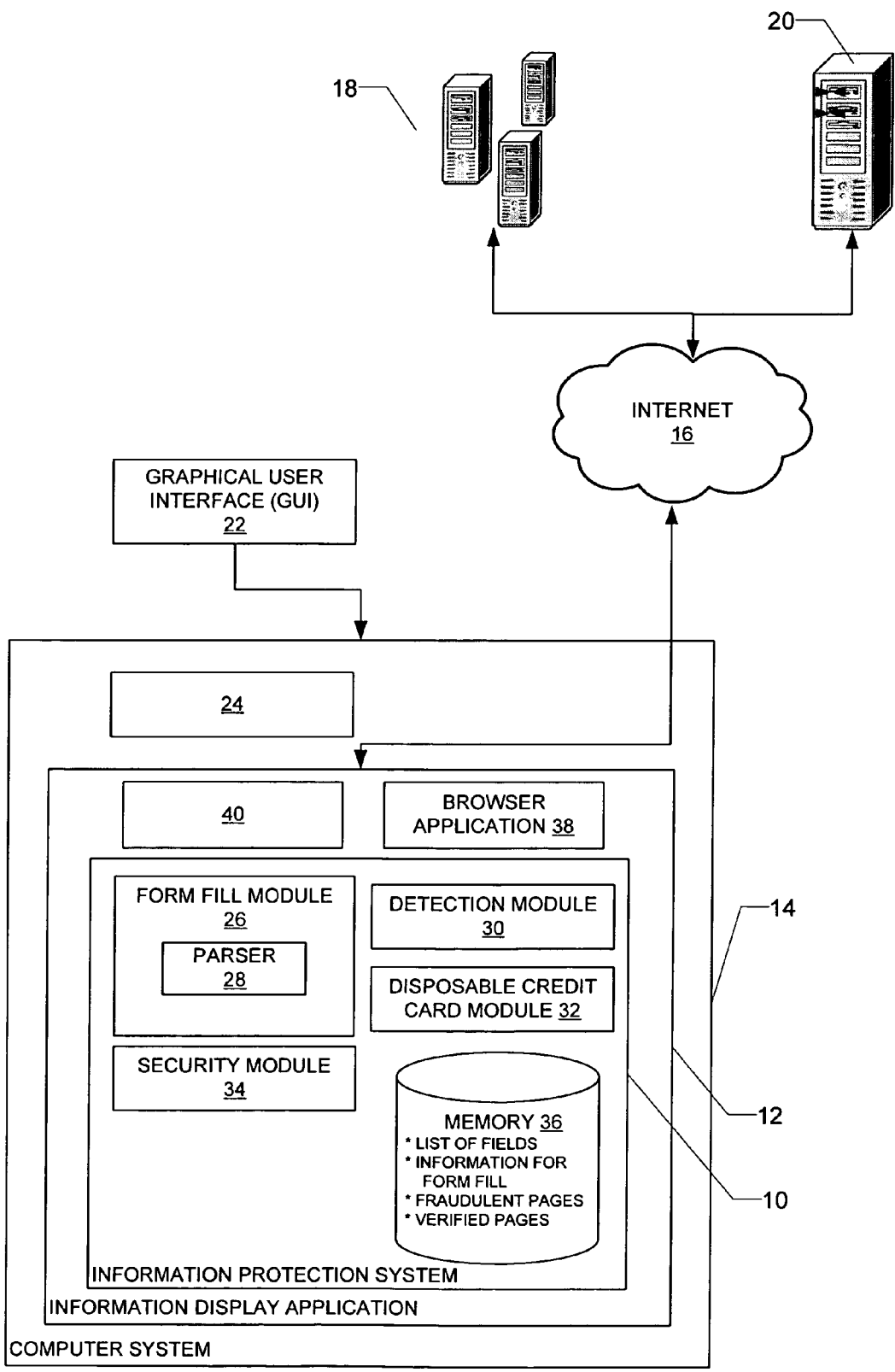
FIG. 1 is a network diagram depicting an information protection system according to an example embodiment.

FIG. 1 is a network diagram depicting an information display application 12 which includes an information protection system 10, according to one exemplary embodiment. The information display application 12 forms part of a larger computer system 14, which is connected via the Internet 16 to various servers 18 and 20. While the example embodiment is described below as being implemented in a client/server network, it will be appreciated other embodiments may be deployed within a peer-to-peer network. Security server 20 communicates with the information display application 12, and in particular with the information protection system 10, to provide information on web sites or web pages accessed by the computer system 14. The computer system 14 is connected to or comprises a graphical user interface (GUI) 22, e.g. a CRT or LCD screen, which is used to access information presented to a user.

Figure 10:
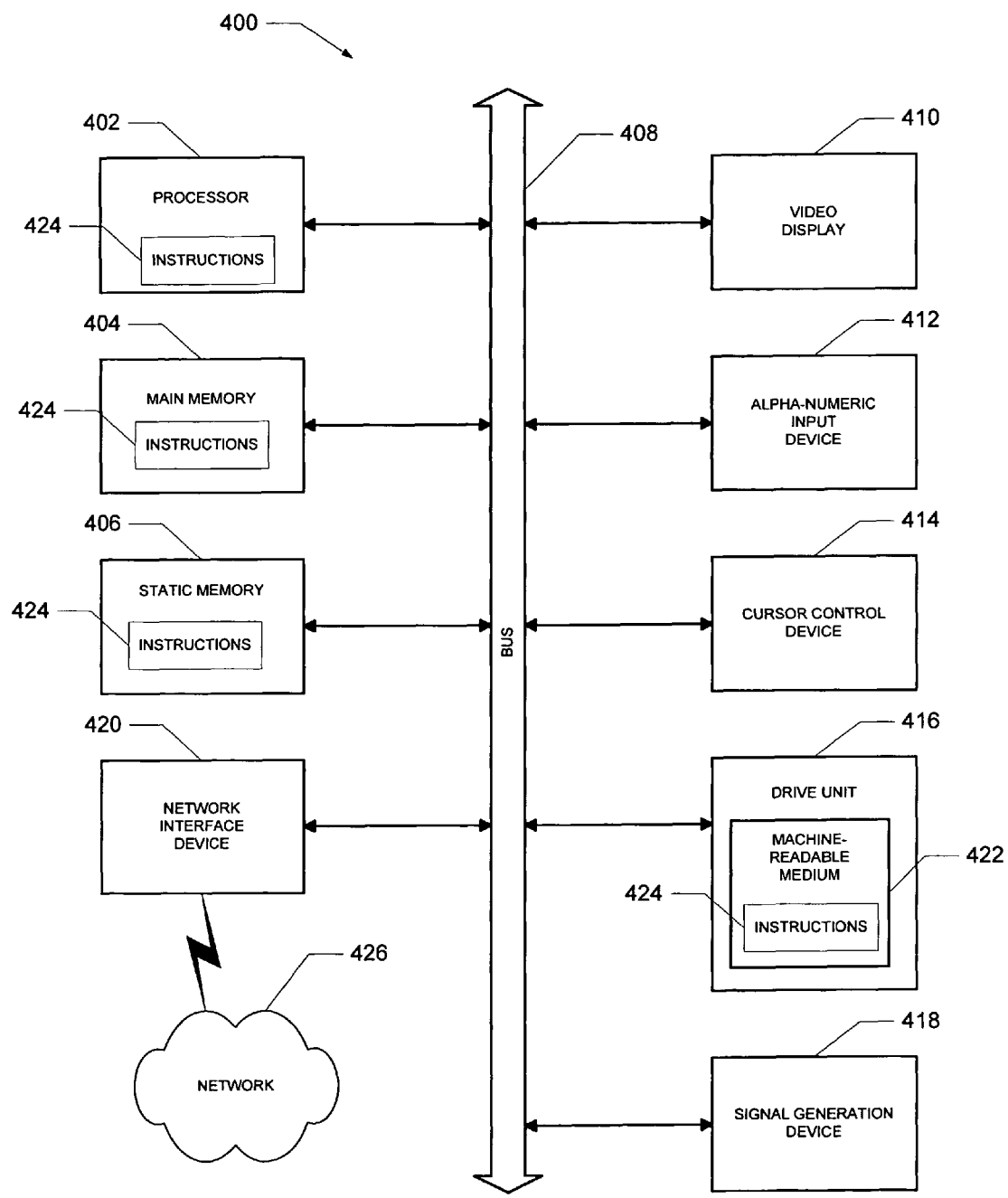
FIG. 10 is a block diagram illustrating a machine for performing the method in accordance with an example embodiment.

The computer system 14 includes various other modules and components 24, which is described in more detail according to FIG. 10.

The information display application 12 provides the computer system 14 with display functionality to display information to a user on the GUI 22. For example, the information display application 12, which may be a web browser (e.g. Netscape or Internet Explorer) receives information and data over the Internet 16 from various servers 18 and 20, and displays this information to the user as user interfaces on the GUI 22. The user interface information may be a markup language document, e.g. an HTML document and the user interface may be a web page. The information display application 12 may typically also include functionality to automatically provide predefined user information into identified fields.

As shown in FIG. 1, the information protection system 10 includes a form fill module 26 having a parser 28. The form fill module 26 predefines an authorized set of fields to receive user information. The predefined authorized set of fields is described in more detail in FIG. 2, but would typically include user login information, user personal information, user contact details, user banking details and payment specific details. The form fill module 26 further receives information from the user relating to the authorized set of fields to receive user information, and predefines and stores this received information which corresponds to the authorized set of fields, to allow the information display application 12 to form fill certain user interfaces when authorized.

The information protection system 10 receives, via the information display application 12, user interface information to be displayed by the information protection system 10 as a user interface, e.g. web page, to the user. The parser 28 parses this user interface information and identifies at least one field within the user interface, which forms part of the authorized set of fields, to receive user information from a user. For example, the user interface information may include a number of personal, address and/or banking detail fields to be filled in by the user. Each of these fields may be identified by the parser 28, in combination with the information predefined as authorized fields to receive user information, as a field to receive user information.

The form fill module 26 receives information from a detection module 30 on the authenticity of the source of the user interface information. The detection module 30 determines whether the user interface information is associated with fraudulent activity, e.g. that the user interface information originated from a fraudulent source, and the detection module 30 may alternatively determine whether the user interface information originated from a verified source.

Typically the detection module 30 determines the authenticity of user interface information by comparing certain user interface information obtained from the user interface to be displayed with lists of addresses of fraudulent or verified sources of user interface information stored in a memory 36 of the information protection system 10. By conducting this comparison, the detection module 30 determines whether the user interface information is fraudulent or verified.

Alternatively, the detection module 30 may communicate with the security server 20 to which the computer system 14 has access through an Internet connection, thereby to determine whether the user interface information is associated with fraudulent activity or originated from a verified source.

In response to the detection module 30 determining that the user interface is associated with fraudulent activity, the form fill module 26 is to provide a warning indicia in or over the field or multiple fields identified by the parser 28, when the user interface is presented to the user by the information display application 12. In addition, the form fill module 26 may disable the functionality of the information display application 12 to automatically provide the user information into the fields identified by the parser 28. The form fill module 26 may further prevent the user from manually inputting any information in the identified fields, thereby to provide an even higher level of protection and security.

The warning indicia may vary between applications, but will typically be selected from a striking colour, a warning message, warning signals or a combination thereof. For example, the warning indicia may be various red blocks displayed over the identified fields, with a centered message in black bold letters stating "DO NOT PROVIDE DETAILS: FRAUDULENT WEB SITE". The warning indicia may, in another example embodiment, be a red stop sign, with the message "STOP—FRAUDULENT SITE" written in it.

Alternatively, in response to the detection module 30 determining that the user interface is not associated with fraudulent activity, the form fill module 26 may enable the functionality of the information display application 12 to automatically provide user information into some or all of the fields identified by the parser 28. In this scenario, the form fill module 26 may enable the functionality of the information display application 12 to automatically provide the user information into the fields identified by the parser 28.

The memory 36 is used to store data relating to the user interface, a predefined authorized set of fields to receive user information, predefined information corresponding to the predefined authorized set of fields, a list of addresses of fraudulent sources of user interface information and a list of addresses of verified sources of user interface information. The detection module 30 may communicate with the security server 20 to which the computer system 14 has access thereby to obtain an updated list of addresses of fraudulent or verified sources of user interface information periodically.

The information protection system 10 also includes a disposable credit card number module 32 to generate a limited use credit card number. The disposable credit card number module 32 is used in certain applications where there is a need for increased security. The disposable credit card number module 32 will generate a credit card number that can only be used once, and will provide this credit card number to the form fill module 26 to automatically fill this number into the designated field identified by the detection module 30. This functionality will only be enabled once the detection module 30 has verified that the user interface information originated from a verified source.

Data Structures

Figure 2:
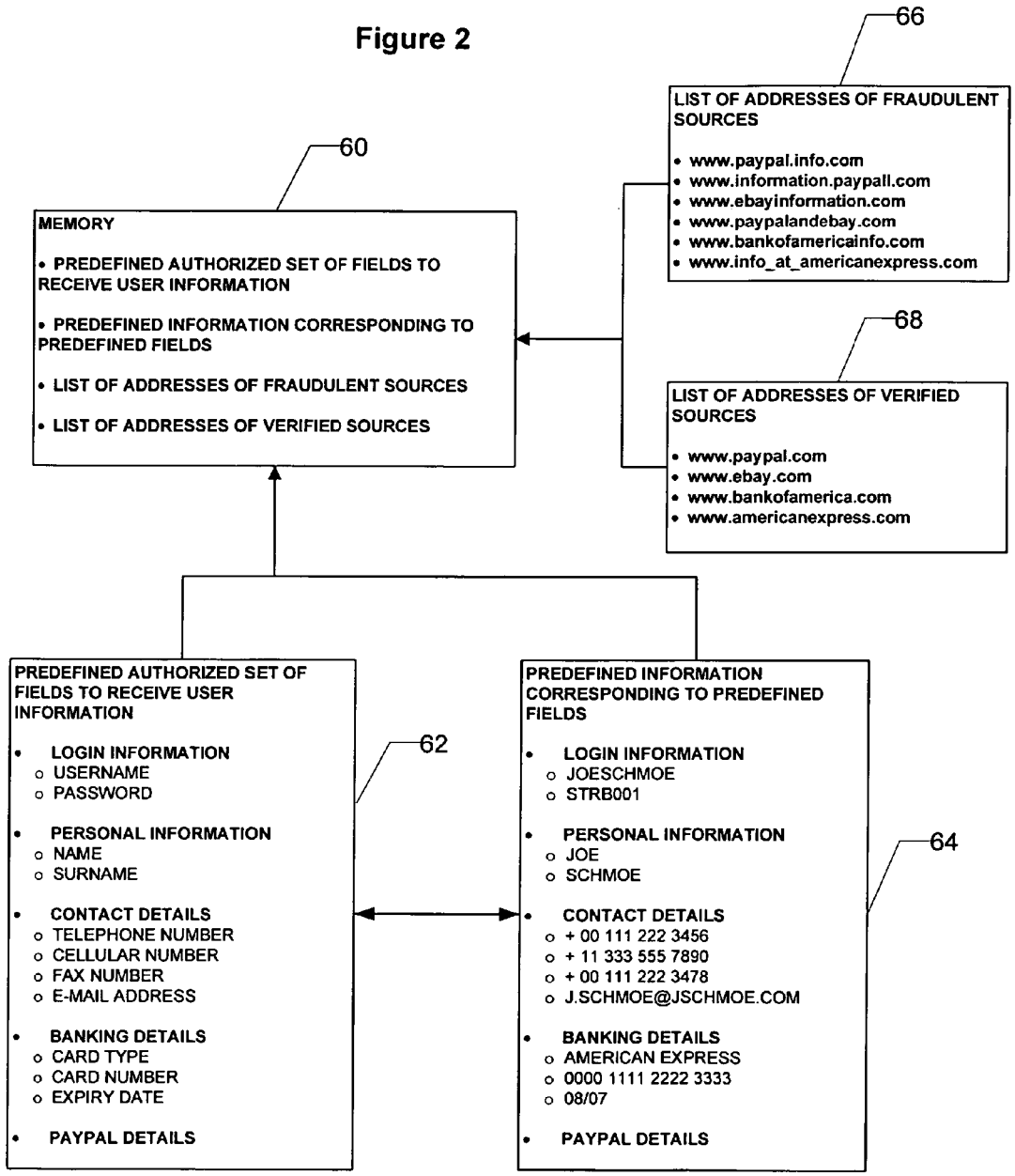
FIG. 2 is a block diagram showing the data structure of the information that may be stored in a memory of the information protection system, in accordance with an example embodiment.

FIG. 2 shows a block diagram of the data structures of the information, according to an example embodiment, that may be stored in the memory 60. The information stored in the memory 60 typically relates to a predefined authorized set of fields to receive user information 62, predefined information corresponding to the predefined authorized set of fields 64, a list of addresses of fraudulent sources 66 of user interface information and a list of addresses of verified sources 68 of user interface information.

As shown, the predefined authorized set of fields to receive user information 62 may be subdivided in user login information, user personal information, user contact details, user banking details and payment specific details, e.g. Paypal details. User login information may include a username and user password, while user personal information may include the user's name and last name. Contact details may include a telephone number, cellular number, fax number and e-mail address. Banking details may include any type of banking account details, but would typically be the user's type of credit card, the credit card number and expiry date of the credit card. It will be appreciated that other fields may also be included as authorized fields, but that the examples of fields to receive user information are typical fields required by most web pages to either register or transact on the Internet.

The predefined information corresponding to the predefined authorized set of fields 64 may be defined when a user first registers for a form fill application. For example, the user may define information to be automatically filled in on any web page or user interface. It will further be appreciated that more than one set of information may be predefined by a user, for example the user may create a private profile which would include the user's personal and home details, and a business profile that will include the user's business numbers and e-mail. FIG. 2 provides an example of a set of predefined information 64 corresponding to the predefined authorized set of fields 62.

An example of a list of addresses of fraudulent sources of user interface information 66 is shown in FIG. 2. The list of fraudulent web site addresses, as in the example, typically includes addresses that closely resemble authentic web site addresses, thereby to enable the URL to be masqueraded.

An example of a list of addresses of verified sources of user interface information 66 is shown in FIG. 2. For example, the list may include www.paypal.com, www.ebay.com, www.bankofamerica.com and www.americanexpress.com.

As mentioned above, both lists are updated periodically by the detection module 30 communicating with the security server 18 to obtain an updated list of addresses of fraudulent or verified sources.

Flowcharts

A high-level method according to an example embodiment is now described with reference to FIG. 3. In operation 100, the parser 28 parses the user interface information which is to be included within the user interface to be displayed to a user by the information display application. The parser 28 identifies, in operation 102, from the parsed user interface information at least one field, within the user interface, to receive user information from a user.

The detection module 30 now determines, as shown in operation 104, whether the user interface information is associated with fraudulent activity; and in response to determining that the user interface information is associated with fraudulent activity, the form fill module 26 provides a warning indicia in or over the at least one field, in operation 106, when the user interface is presented to a user by the information display application. Also, once it is determined that the user interface information is associated with fraudulent activity, and as shown in operation 108, the form fill module 26 disables the functionality of the information display application 12 to automatically provide user information into the identified fields.

In the event that the detection module 30 determines that the user interface information is not associated with fraudulent activity, the form fill module 26 enables, in operation 110, the functionality of the information display application 12 to automatically provide user information into the at least one field.

Figure 4A:
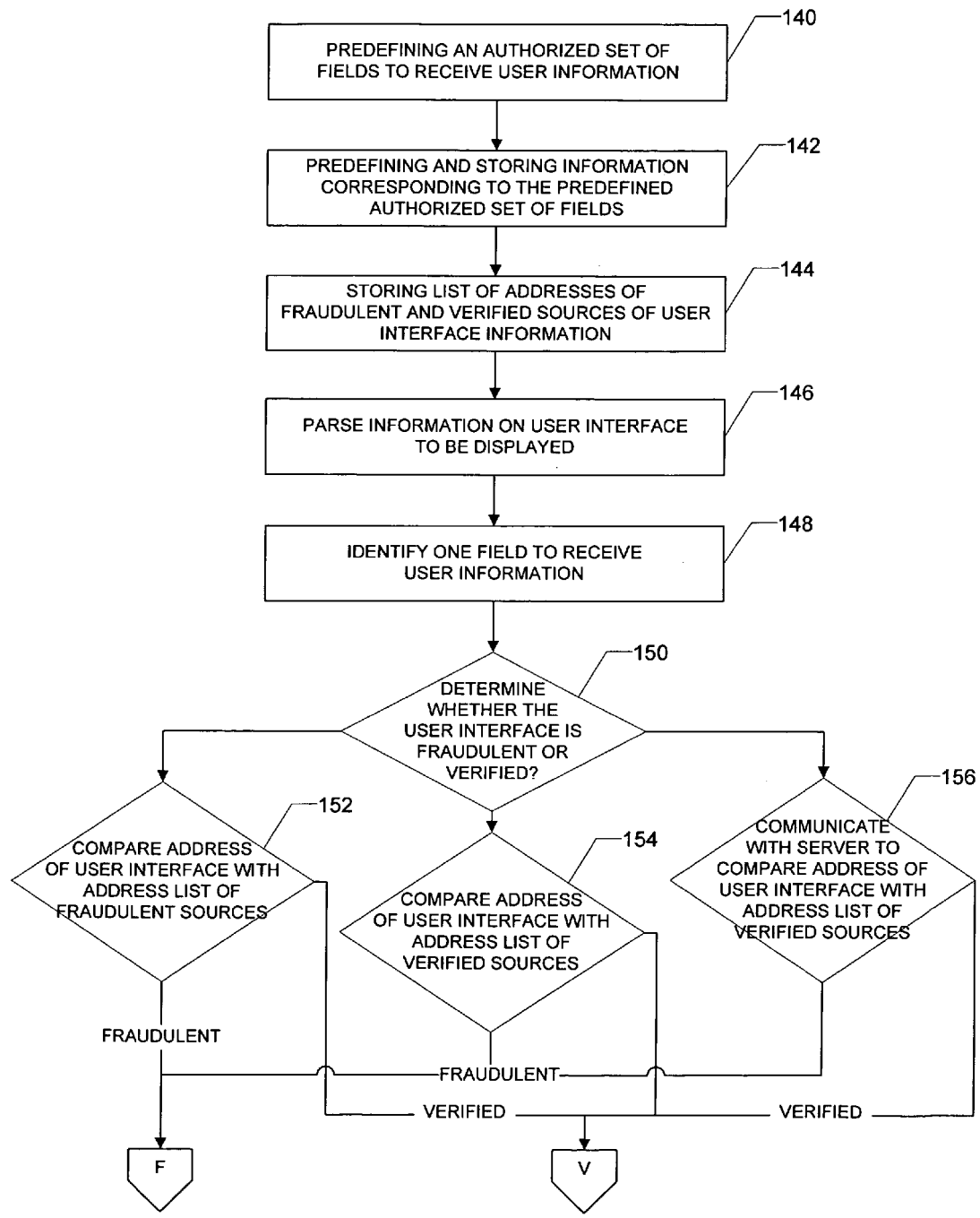
FIGS. 4a and 4b show a detailed flow diagram of the method, in accordance with an example embodiment.
Figure 4B:
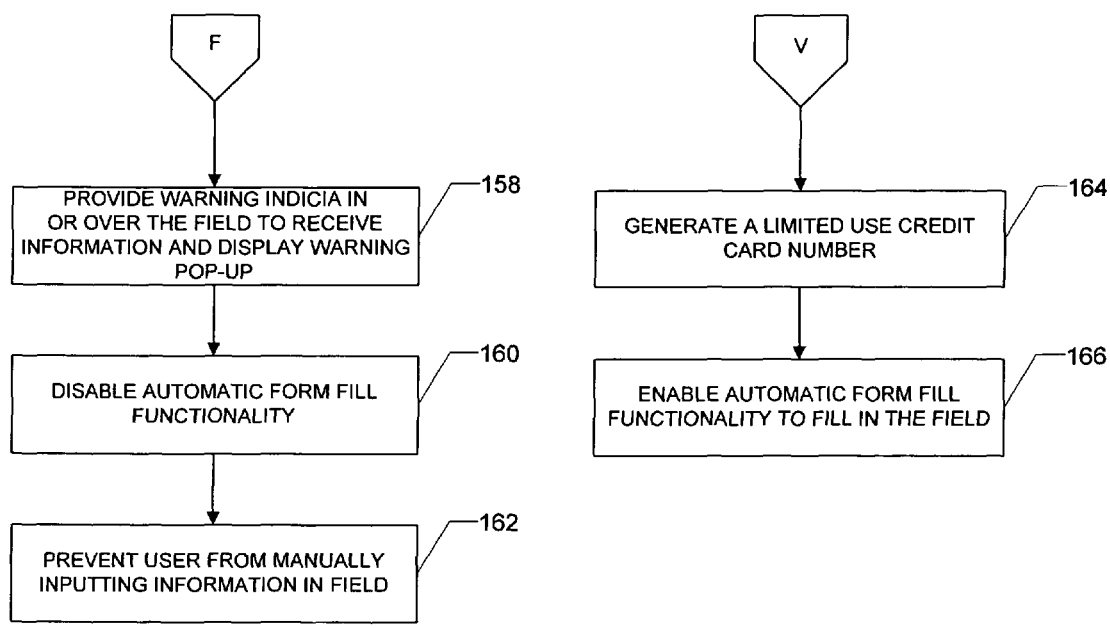

FIGS. 4a and 4b show a detailed flow diagram of the method, in accordance with an example embodiment. In operation 140 of FIG. 4a, the form fill module 26 predefines an authorized set of fields to receive user information. This authorized set of fields may be similar to those described in FIG. 2. The form fill module 26 further predefines and stores information received from a user, which corresponds to the authorized set of fields, in the memory 36 (operation 142), to later use this information to form fill authorized user interfaces.

In operation 144, a list of addresses of fraudulent sources of user interface information and a list of addresses of verified sources of user interface information are stored in the memory 36. These lists may be obtained from the security server 20, by the detection module 30. The detection module 30 may also update the lists from time to time by communicating with the security server 20.

Figure 3:
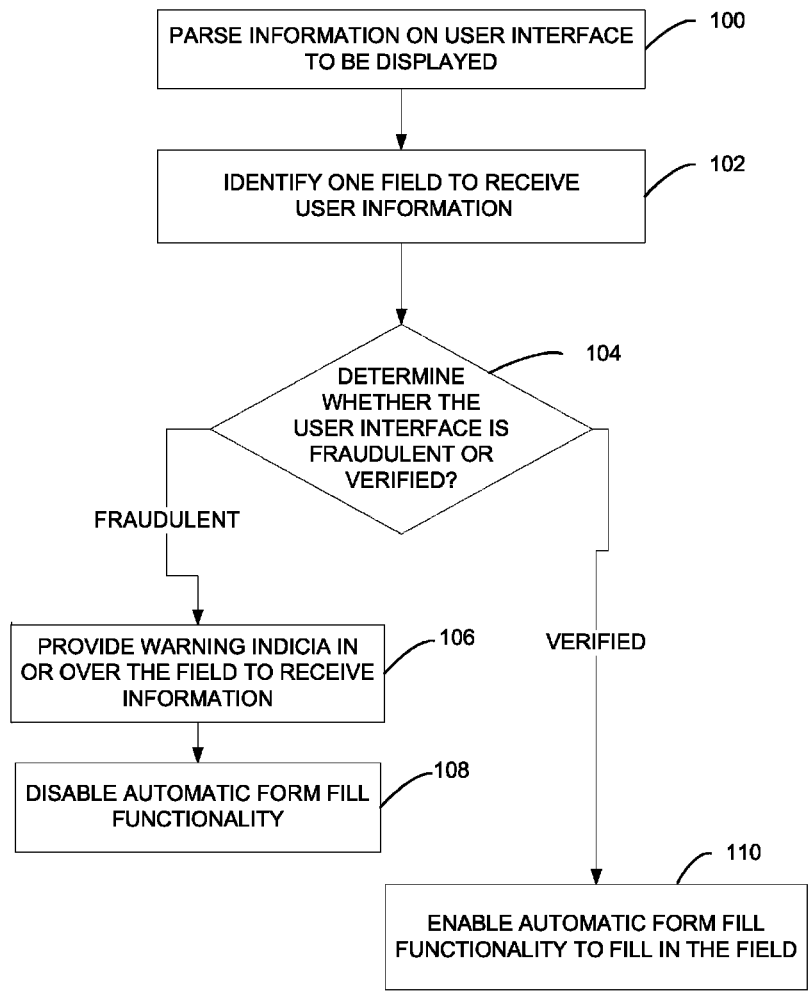
FIG. 3 is a high-level flow diagram of the method according to an example embodiment.

Similar to operation 100 of FIG. 3, the parser 28 now parses, in operation 146, the user interface information which is to be included within the user interface to be displayed to a user by the information display application. The parser 28 identifies, in operation 148, from the parsed user interface information, at least one field within the user interface, to receive user information from a user.

In operation 150, the detection module 30 determines whether the user interface information is associated with fraudulent activity, or alternatively, whether the user interface information originated from a verified source. Operation 150, determining whether the user interface information is from a fraudulent or verified source, may include, as shown in operation 152, comparing a network address included in the user interface information with the list of addresses of fraudulent sources 66 stored in the memory 36. Alternatively, operation 150 may include comparing a network address included in the user interface information with the list of addresses of verified sources 68 stored in the memory 36 (operation 154). As shown in operation 156, the detection module 30 may also communicate with the security server 20 to compare a network address included in the user interface information with a list of addresses of fraudulent or verified sources stored in a memory on the server.

Figure 9:
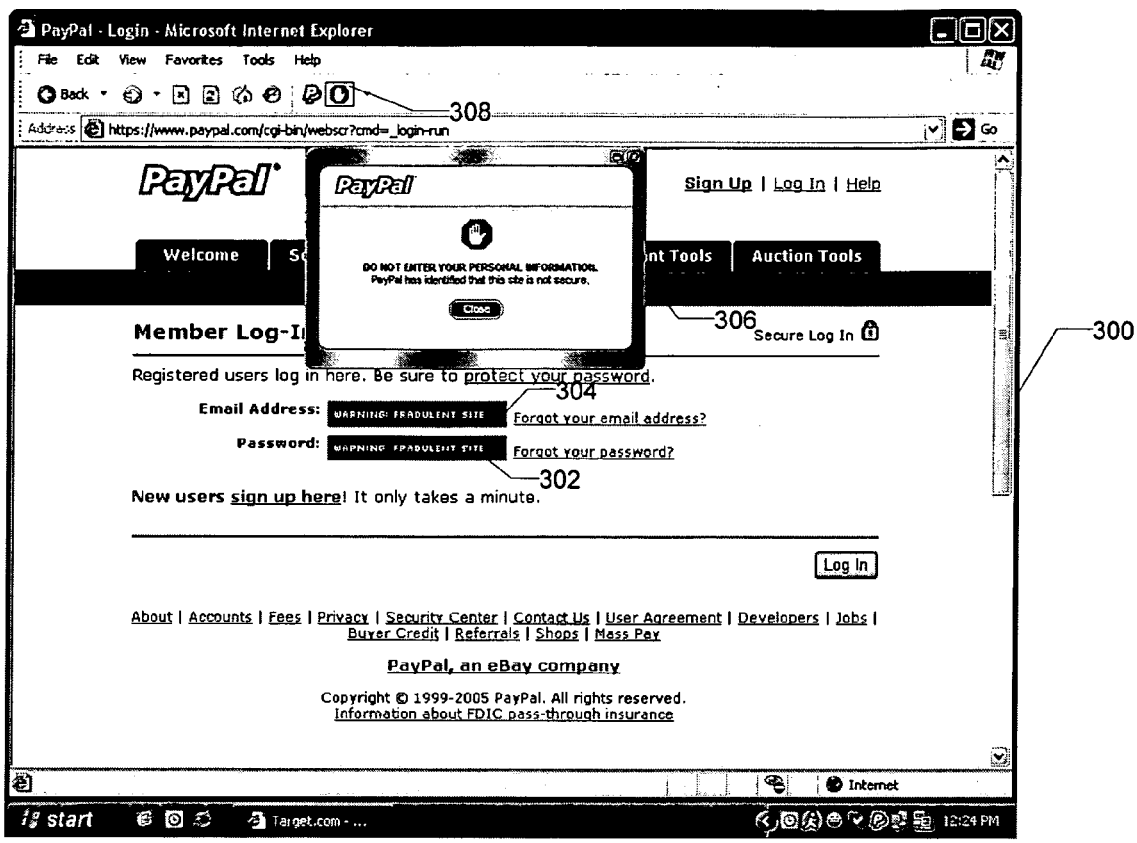
FIG. 9 shows a screenshot of a user interface, according to an example embodiment, where user interface information is identified as originating from a fraudulent source.

Once it has been determined that the user interface information is associated with fraudulent activity, the form fill module 26 provides a warning indicia in or over the at least one field, as shown in operation 158 of FIG. 4b, when the user interface is presented to a user by the information display application. In addition to providing warning indicia in association with the at least one field, the form fill module 26 may also display a pop-up window (e.g., as shown in FIG. 9). Also, and as shown in operation 160, the form fill module 26 may disable the functionality of the information display application 12 to automatically provide user information into the identified fields. To further increase the security features of this application, the form fill module 26 may, in response to determining that the user interface information is associated with fraudulent activity, prevent the user from manually inputting any information in the identified fields (operation 162).

Should it be determined by the detection module 30 that the user interface information originated from a verified source, and as shown in operation 164, a limited use credit card number may be generated by the disposable credit card module 32, for a financial transaction relating to one of the identified fields. Also, in operation 166, the form fill module 26 enables the functionality of the information display application 12 to automatically provide user information into the at least one field.

User-Interfaces

FIGS. 5 to 8 show screenshots of various user interfaces according to an example embodiment, where the user interface information is identified as originating from a verified source. The screenshots are from Target's web site, which is an on-line vendor. As already mentioned, it will be appreciated that the present application can also be used with other web sites, such as banking web sites, other on-line vendor web sites and payment web sites.

Figure 5:
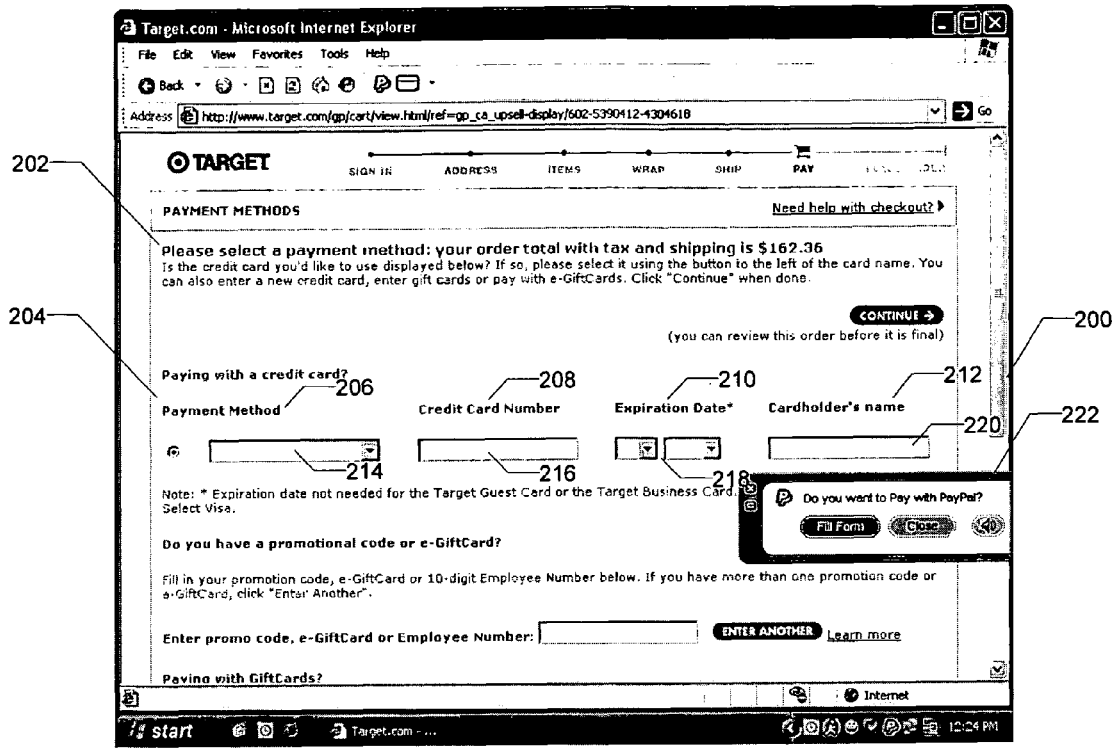
FIGS. 5 to 8 show screenshots of various user interfaces, according to an example embodiment, where user interface information is identified as originating from a verified source.

FIG. 5 shows a screenshot 200 of the payment page of the Target web site, after a user has already signed in, entered an address, selected items to be purchased, provided wrapping information and has entered shipping information. All the information shown on the screenshot forms part of the user interface information to be displayed. This web page provides the user with information on the amount to be paid 202 and requests information from the user to enter payment method details 204.

The form fill module 26 would already have predefined an authorized set of fields to receive user information. For example, the predefined authorized set of fields may be payment method 206, credit card number 208, expiry date of the credit card 210 and the card holder's name 212. The form fill module 26 has further already predefined and stored user information which corresponds with these authorized fields in the memory 36. This stored information will be filled in the open fields 214, 216, 218 and 220, should the user interface information have originated from a verified source. A PayPal form fill pop-up 222 is also shown, requesting information from the user to select PayPal as the payment method.

Figure 6:
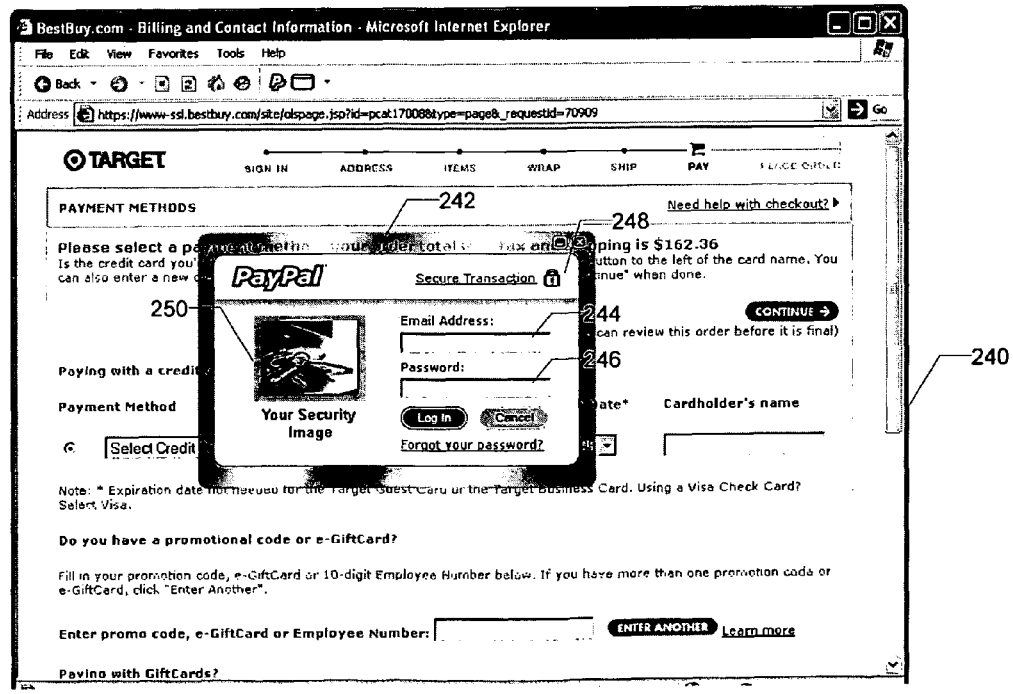

FIG. 6 shows a screenshot 240 where the user has selected Paypal, from the form fill pop-up 222, as the payment method. A PayPal login pop-up 242 is displayed over the payment page of the Target web site, and requests the e-mail address of the user 244 and the user's password 246. The PayPal login pop-up 242 also displays a secure icon 248 to indicate that the transaction is secure. The PayPal login pop-up 242 may further include a security image 250 which is a preselected image selected by a user. This security image 250 is stored in the security module 34 and provides further security features to the application. If this security image is not displayed with the PayPal login pop-up 242, a user should know that the web site is fraudulent.

The information protection system, through the parser 128, parses the interface information which is to be included within the user interface and identifies from the parsed user interface information, the fields within the user interface, to receive user information e.g. from FIG. 5 the payment method 206, credit card number 208, expiry date of the credit card 210 and the card holder's name 212, and, from FIG. 6, the e-mail address of the user 244 and the user's PayPal password 246.

The detection module 30 now determines that the user interface information is not associated with fraudulent activity but that the user interface information originated from a verified source.

Figure 7:
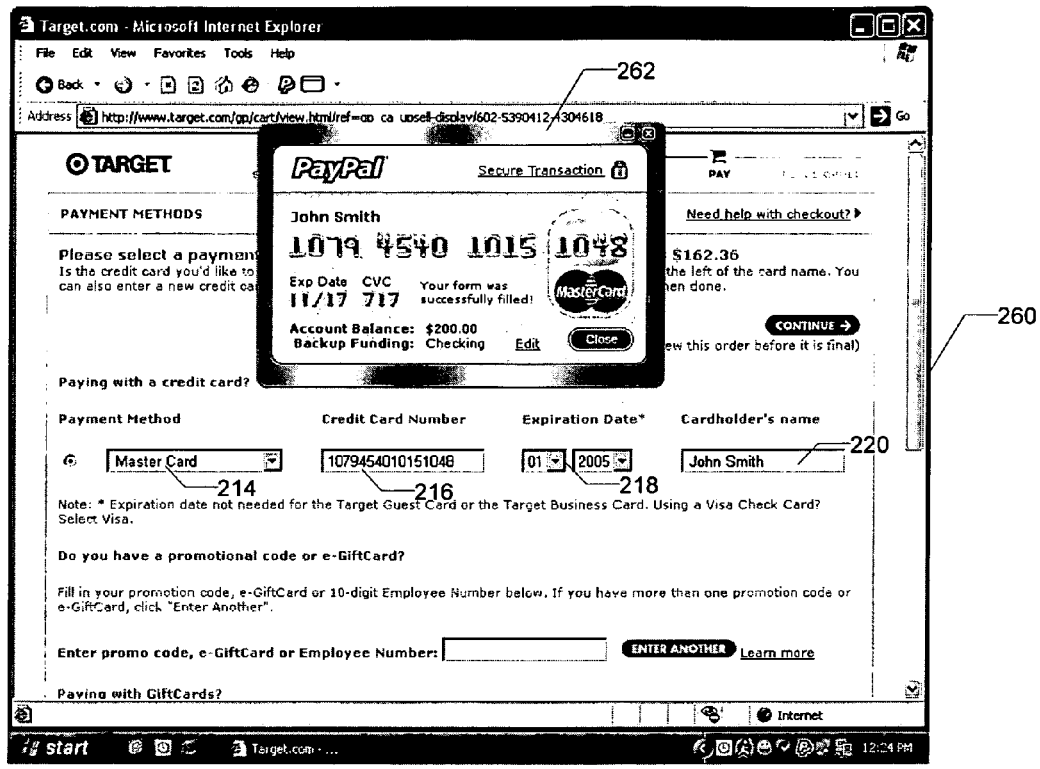

As shown in the screenshot 260 of FIG. 7, after it has been determined that the user interface information is from a verified source, a limited use credit card number is generated by the disposable credit card module 32 and presented to the user 262. The form fill module 26 further enables the functionality of the information display application 12 to automatically provide user information into identified fields which is shown to be "Mastercard" in the payment method open field 214, "1079454010151048" in the credit card number open field 216, "01/2005" in the expiry date of the credit card open field 218 and "John Smith" in the card holder's name open field 220.

Figure 8:
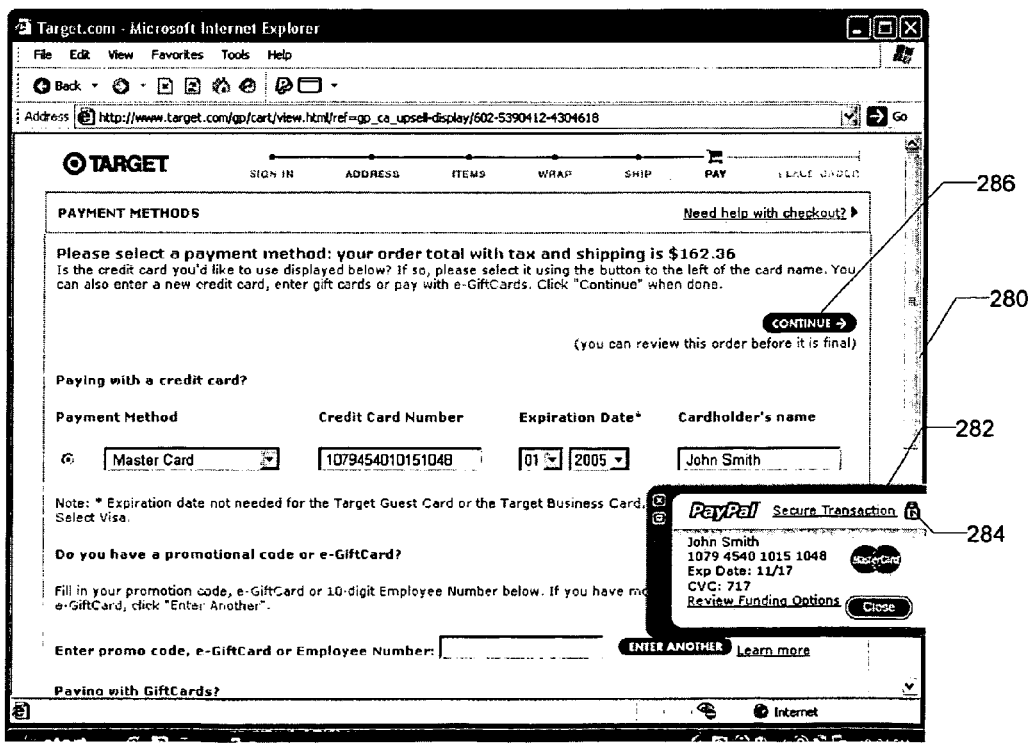

In the final screenshot 280 of FIG. 8, details 282 of the limited use credit card are shown again. A security icon 284 is also shown to indicate that it is a secure transaction. The user can now press the continue button 286 as all the necessary payment information has been provided. The order placement will be confirmed and completed.

In the event that the detection module 30 determines that the user interface information, as shown in screenshot 240 of FIG. 6, is associated with fraudulent activity and therefore originated from a fraudulent source, the information display application will display the user interface as shown by screenshot 300 in FIG. 9. The form fill module 26 provides various warning indicia 302, 304 and 306 in and over the identified fields. Also, the form fill module 26 disables the functionality of the information display application 12 to automatically provide user information into the identified fields. A security alert icon 308, e.g. a red hand stop signal, is also displayed in the toolbar.

FIG. 10 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to protect information have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a hardware processor;
   a parser to, parse user interface information to be included within a user interface to be displayed to a user by an information display application; and identify at least one field, within the user interface, to receive user information from a user;

a memory storage device to store data, the data including:
the user information,
the user interface information,
a predefined authorized set of fields to receive the user information,
predefined information corresponding to the predefined authorized set of fields,
a list of addresses of fraudulent sources of the user interface information, and
a list of addresses of verified sources of the user interface information;

a detection module to determine, based on the list of addresses of fraudulent sources and based on the list of addresses of verified sources, whether the user interface information is associated with fraudulent activity or originates from a verified source;

a form fill module to,
in response to determining that the user interface information is associated with fraudulent activity, provide, using the hardware processor, a warning indicia relative to the at least one field of the user interface displayed to the user by the information display application, disable automatic provision of the user information into the at least one field, and prevent the user from manually inputting information into the at least one field that is displayed to the user by the information display application, and
in response to determining that the user interface information originates from a verified source, enable automatic provision of the user information into the at least one field based on the at least one field corresponding to the predefined authorized set of fields and based on predefined information that corresponds to the at least one field; and a disposable credit card number module to,
generate, in response to the determining that the user interface information originates from a verified source, a limited use credit card number for a financial transaction, and
provide the limited use credit card number to the form fill module, wherein the form fill module is configured to automatically fill the limited use credit card number into a credit card number field, designated as such by the detection module, for the financial transaction in response to receiving the limited use credit card number from the disposable credit card number module and based on the credit card number field corresponding to the predefined authorized set of fields.

2. The system of claim 1, wherein the user interface is a web page, and the information display application is a web browser.

3. The system of claim 1, wherein the user interface information comprises a markup language document.

4. The system of claim 1, wherein the parser forms part of the form fill module.

5. The system of claim 1, wherein the detection module is to compare a network address included in the user interface information with the list of addresses of fraudulent sources stored in the memory, thereby to determine whether the user interface information is fraudulent.

6. The system of claim 1, wherein the detection module is to compare a network address included in the user interface information with the list of addresses of verified sources stored in the memory, thereby to determine whether the user interface information is verified and originated from the verified sources.

7. The system of claim 1, wherein the detection module is to communicate with a server to obtain an updated list of addresses of fraudulent or verified sources.

8. The system of claim 1, wherein the detection module is to communicate with a server to determine whether the user interface information is associated with fraudulent activity.

9. The system of claim 1, wherein the detection module is to communicate with a server to determine whether the user interface information originated from a verified source.

10. The system of claim 1, wherein the warning indicia is selected from a striking colour, a warning message, warning signals, or a combination thereof.

11. The system of claim 1, further comprising a security server to provide information on a source of the user interface information.

12. The system of claim 1, wherein the warning indicia is provided within the at least one field to prevent the user from manually inputting information into the at least one field.

13. A method comprising:
parsing user interface information to be included within a user interface to be displayed to a user by a display application;
identifying at least one field, within the user interface, to receive user information from a user;
storing, in memory, data including:
the user information,
the user interface information,
a predefined authorized set of fields to receive the user information,
predefined information corresponding to the predefined authorized set of fields,
a list of addresses of fraudulent sources of the user interface information, and
a list of addresses of verified sources of the user interface information;
determining whether the user interface information is associated with fraudulent activity or originates from a verified source based on the list of addresses of fraudulent sources and the list of addresses of verified sources stored in the memory; and
in response to determining that the user interface information originates from a verified source:
enabling automatic provision of the user information into the at least one field based on the at least one field corresponding to the predefined authorized set of fields and based on predefined information that corresponds to the to the at least one field, generating a limited use credit card number for a financial transaction, and automatically filling, for the financial transaction, the limited use credit card number into a designated credit card number field based on the designated credit card number field corresponding to the predefined authorized set of fields; instead of: providing a warning indicia relative to the at least one field of the user interface displayed to the user by the information display application, disabling automatic provision of the user information into the at least one field, and preventing the user from manually inputting information into the at least one field that is displayed to the user by the information display application.

14. The method of claim 13, further including determining whether the user interface information originated from a verified source.

15. The method of claim 13, wherein identifying the at least one field within the user interface to receive user information from the user includes predefining the predefined authorized set of fields to receive the user information.

16. The method of claim 13, wherein determining whether the user interface information is associated with fraudulent activity or originates from a verified source includes comparing a network address included in the user interface information with the list of addresses of fraudulent sources stored in the memory.

17. The method of claim 13, wherein determining whether the user interface information is associated with fraudulent activity or originates from a verified source includes comparing a network address included in the user interface information with the list of addresses of verified sources stored in the memory.

18. The method of claim 13, wherein determining whether the user interface information is associated with fraudulent activity or originates from a verified source includes communicating with a server to obtain an updated list of addresses of fraudulent or verified sources.

19. The method of claim 13, wherein determining whether the user interface information is associated with fraudulent activity or originates from a verified source includes communicating with a server to compare a network address included in the user interface information with a list of addresses of fraudulent or verified sources stored in a memory on the server.

20. The method of claim 13, wherein the user interface is a web page, and the display application is a web browser.

21. The method of claim 13, wherein the user interface information comprises a markup language document.

22. The method of claim 13, wherein the warning indicia is provided within the at least one field to prevent the user from manually inputting information into the at least one field.

23. A non-transitory computer-readable storage medium comprising instructions which, when executed by a computer, cause the computer to perform operations comprising:
    parsing user interface information to be included within a user interface to be displayed to a user by a display application;
    identifying at least one field, within the user interface, to receive user information from a user;
    storing, in memory, data including:
        the user information,
        the user interface information,
        a predefined authorized set of fields to receive the user information,
        predefined information corresponding to the predefined authorized set of fields,
        a list of addresses of fraudulent sources of the user interface information, and
        a list of addresses of verified sources of the user interface information;
    determining whether the user interface information is associated with fraudulent activity or originates from a verified source based on the list of addresses of fraudulent sources and the list of addresses of verified sources stored in the memory;
    in response to determining that the user interface information is associated with fraudulent activity:
        providing a warning indicia relative to the at least one field of the user interface displayed to the user by the display application,
        disabling automatic provision of the user information into the at least one field, and
        preventing the user from manually inputting information into the at least one field that is displayed to the user by the display application; and
    in response to determining that the user interface information originates from a verified source:
        enabling automatic provision of the user information into the at least one field based on the at least one field corresponding to the predefined authorized set of fields and based on predefined information that corresponds to the to the at least one field,
        generating a limited use credit card number for a financial transaction, and
        automatically filling, for the financial transaction, the limited use credit card number into a designated credit card number field based on the designated credit card number field corresponding to the predefined authorized set of fields.

24. A system comprising:
first means for:
    parsing user interface information to be included within a user interface to be displayed to a user by an information display application; and
    identifying at least one field, within the user interface, to receive user information from the user;
memory storage means for storing data, the data including:
    the user information,
    the user interface information,
    a predefined authorized set of fields to receive the user information,
    predefined information corresponding to the predefined authorized set of fields,
    a list of addresses of fraudulent sources of the user interface information, and
    a list of addresses of verified sources of the user interface information;
second means for determining whether the user interface information is associated with fraudulent activity or originates from a verified source based on the list of addresses of fraudulent sources and the list of addresses of verified sources stored in the memory storage means;
third means for:
    in response to determining that the user interface information is associated with fraudulent activity,
        providing warning indicia relative to the at least one field of the user interface displayed to the user by the information display application,
        disabling automatic provision of the user information into the at least one field, and
        preventing the user from manually inputting information into the at least one field that is displayed to the user by the information display application; and
    in response to determining that the user interface information originates from a verified source, enabling automatic provision of the user information into the at least one field based on the at least one field corresponding to the predefined authorized set of fields and based on predefined information that corresponds to the at least one field; and
fourth means for, in response to the determining that the user interface information originates from a verified source
    generating a limited use credit card number for a financial transaction, and
    providing the limited use credit card number to the third means, wherein the third means is for automatically filling the limited use credit card number into a credit card number field, designated as such by the second means, for the financial transaction in response to receiving the limited use credit card number from the fourth means and based on the credit card number field corresponding to the predefined authorized set of fields.

25. The system of claim 24, wherein the third means is further for receiving a user definition of information to be automatically filled into the user interface.

26. The system of claim 24, wherein the third means is further for predefining the predefined authorized set of fields to receive the user information, wherein the at least one field is part of the predefined authorized set of fields.

* * * * *